Sept. 17, 1963  E. DRESEN  3,104,347

PLURAL MOTOR POWERED TOOTHBRUSH

Filed Dec. 22, 1961

INVENTOR— ESBERN DRESEN

Edward Eversley Bishop

PATENT ATTORNEY.

United States Patent Office 3,104,347
Patented Sept. 17, 1963

3,104,347
PLURAL MOTOR POWERED TOOTHBRUSH
Esbern Dresen, 15301 Rio Terrace Drive,
Edmonton, Alberta, Canada
Filed Dec. 22, 1961, Ser. No. 161,725
2 Claims. (Cl. 318—5)

This invention relates to a portable hand held battery powered toothbrush and to mechanism for reversing the direction of rotation of the toothbrush.

It is a known fact that, for proper and effective brushing of the teeth, the brushing action should be downwardly on the upper teeth and upwardly on the lower teeth.

I am aware that a number of powered toothbrushes have been advanced in the past but these have all suffered from the difficulty that it is not possible to reverse the direction of rotation of the toothbrush or, if a motor is used that is capable of being reversed, the motor is of large size and the resultant toothbrush is of large and unwieldly proportions.

Further, the majority of such devices have used a motor that must be plugged into ordinary house current and are not capable of use unless such current is available.

It is the principal object of my device to provide a new and improved self-contained battery powered toothbrush using motors of small size to reduce the overall size and weight of the complete toothbrush and incorporating a unique system for reversing the direction of rotation of the toothbrush without undue strain on the motors and actuating mechanism of the device.

With particular reference to drawings illustrating a preferred embodiment of my device:

Figure 1:
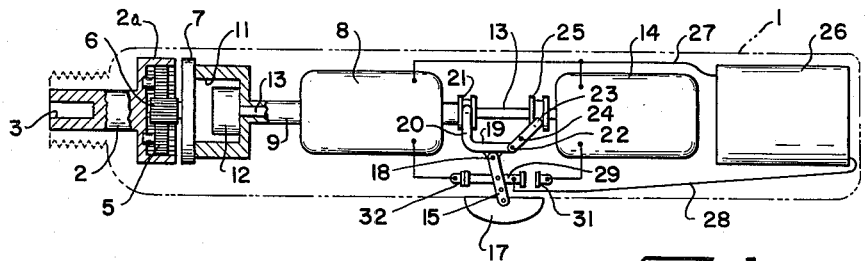
FIG. 1 is a partly broken away side elevation of my device with the housing therefor illustrated in phantom lines and with the mechanism adjusted to withdraw the second shaft and to place the first drive shaft and drive motor in operation.

With reference now to the drawings I have illustrated the housing 1 which may be generally cylindrical in shape and preferably would be constructed in two halves hinged together to be opened longitudinally for the repair or replacement of motors, battery or drive mechanisms. While I have not considered it necessary to illustrate the housing, I consider that the halves of the housing would be secured together with counter sunk screws or other fastening means well known in constructions of this nature and an end cap engaged threadably in the rear end of the device whereby the batteries could be replaced if desired without opening the entire case.

A stub shaft 2 is positioned at the forward end of the housing 1, the stub shaft being formed with a socket 3 to receive the end of a bush shaft which would have bristles at its opposite end. While I have not illustrated the precise method for mounting the stub shaft 2 in the housing 1, it will be obvious that the shaft would be mounted with a leakproof seal between the shaft and the housing so that unwanted moisture could not enter the housing at this point.

The shaft 2 is enlarged as indicated at 2a and is counterbored to provide a socket for the reception of the planetary gears 5, which are driven by the central drive gear 6 projecting from the friction drive plate 7. The planetary gears 5 are of common construction and preferably would be three in number to mesh with gear teeth in the inner periphery of the counterbore of the enlarged portion 2a. With this construction, it will be obvious that location of the friction drive plate 7 will act through the planetary gears 5, to rotate the stub shaft 2. Obviously the provision of the planetary gear train will provide a considerable gear reduction and power increase from the drive motors to the stub shaft 2.

Drive for the friction plate 7 is accomplished through the first electrical motor 8 which is mounted within the housing 1 by any suitable means. The motor 8 has a hollow drive shaft 9 mounted slidably centrally in the motor and capable of longitudinal movement with respect to the motor 8 during rotation of the shaft by the motor 8. The exterior of the shaft 9 may be squared or splined to provide a slidable driving connection with the motor and it is important to note that the interior of the shaft 9 is cylindrical in cross section. The drive shaft 9 is formed with the enlarged head 10 at its one end to engage with the frictional drive plate 7 and it should be noted that the head 10 is counterbored centrally as indicated at 11 to receive the driving head 12 of the solid shaft 13 of the second drive motor 14.

The second drive motor 14 similar in size and shape to the first drive motor 8, is mounted in the housing 1 similarly to the first drive motor and is constructed to rotate in a direction opposite to the direction of the first drive motor 8. A solid drive shaft 13 is fitted slidably through the hollow drive shaft 9 to rotate therein and the solid drive shaft 13 has a slidable driven connection with the second drive motor 14. As described previously the solid drive shaft 13 is formed with a driving head 12 which may be nested in the counterbore 11 of the driving head 10 on the shaft 13.

It will now be obvious that either the head 10 or the head 12 may be moved into or out of contact with the friction plate 7 and when either the head 12 or 10 is in contact with the friction drive plate 7, actuation of the appropriate motor 8 or 14 will rotate the drive shaft.

Movement of the shafts 9 and 13 during rotation by the motors 8 and 14 is accomplished by manipulation of the button 17 affixed to the actuating lever 15. The lever 15 is mounted pivotally at 16 in the housing 1 to project outside the housing 1 and is provided with the external button 17 at that end.

Within the housing, the lever 15 is connected pivotally at 18 to the bar 19 which is formed into the fork 20 having a running connection with the follower 21 secured on the shaft 9. The bar 19 is connected pivotally at 22 to a second fork 23 fulcrumed at 24 and which has a running connection with the follower 25 secured to the shaft 13. As best illustrated in FIGURES 1 and 2 in the drawings, movement of the finger button 17 will move the actuating lever 15 in either a left or right direction and this will move the shafts 9 and 13 alternately backwardly and forwardly and into and out of engagement with the driving plate 7.

For example, as seen in FIG. 1, the button 17 is moved to the right and the shaft 9 is then moved forwardly with respect to the motor 1 while the shaft 13 is moved rearwardly. This places the driving head 10 in frictional engagement with the friction plate 7 and it will be obvious that operation of the motor 8 will then rotate the shaft 9 and through the head 10 rotate the friction plate 7.

Figure 2:
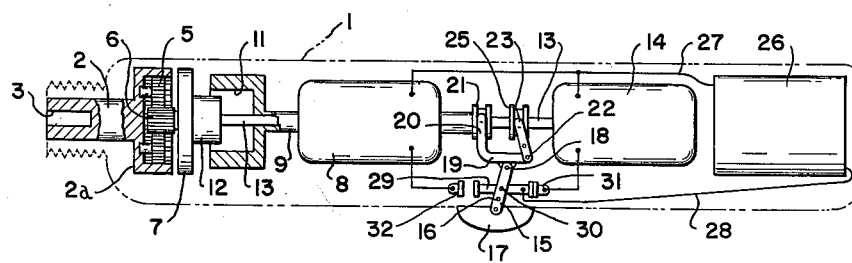
FIG. 2 is another side elevation partly broken away and sectionalized with the housing in phantom lines and illustrating the mechanism positioned to withdraw the first drive shaft and to place the second drive motor and drive shaft in operation.
Figure 3:
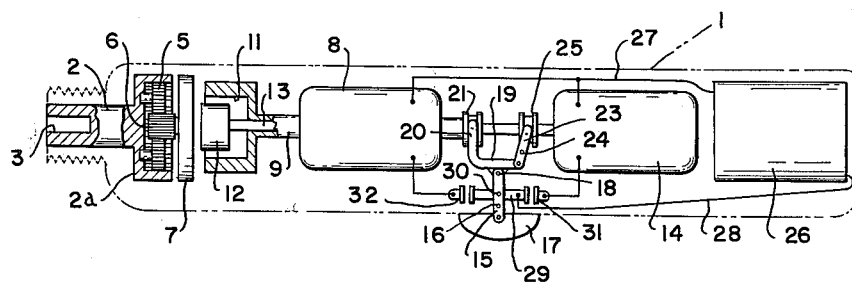
FIG. 3 is another side elevation again partly broken away and sectionalized with the housing shown in phantom lines and illustrating the mechanism in the neutral position with both motors shut off and with the drive shafts disengaged.

When the button 17 is moved in the opposite direction or to the left as best seen in FIG. 2 in the drawings, the drive shaft 9 and the head 10 will be withdrawn from frictional engagement with the friction plate 7 and the shaft 13 and the head 12 will be moved forwardly into frictional contact. Thereafter, operation of the motor 13 will obviously rotate the friction plate 7 in the opposite direction to the rotation by the drive motor 8.

In the preferred embodiment illustrated in the drawings, the motors 8 and 14 are powered by the battery 26 which is fitted in the housing behind the motors 8 and 14. In the embodiment illustrated, the battery is shown connected permanently at one side through the connection 27 to one side of the motors 14 and 8 while the other connection from the battery is routed through the circuit 28 to the movable switch contact 29. The movable switch contact is connected at 30 to the actuating lever 15 and fixed contacts 31 and 32 are connected at 33 and 34 to the motors 14 and 8 respectively.

Connected in this manner, it will be obvious that, whenever the lever 15 is moved in either direction as shown in FIG. 1 or FIG. 2 the electric motors 8 and 14 will be connected to the battery and will be placed in operation to drive the respective drive shafts and at the same time disconnect the other motor so that the drive shaft that is withdrawn will not be rotated.

While I have illustrated the battery 26 wired into the circuit to the motors 8 and 14 and the switch contact 29, it will be obvious that a springable connection similar to that found in a conventional flashlight could be provided in the housing 1 and when the battery 26 was inserted and an end cap placed on the housing, connections to the battery would be completed.

What I claim as my invention is:

1. In a powered reversible toothbrush, a housing, a socket mounted rotatably at one end of the housing, a first motor rotatable in one direction and mounted in the housing, a hollow drive shaft having a slidable driven connection with the first motor, a second motor rotatable in the opposite direction to the first motor and mounted in the housing, a solid drive shaft mounted slidably in the hollow drive shaft coaxially therewith and having a slidable driven connection with the second motor, means to reciprocate the hollow drive shaft and the solid drive shaft to alternately engage and disengage the hollow drive shaft and the solid drive shaft with the socket in the housing, a power source, and means to connect the power source to the first or second drive motor coincidentally with the engagement of the hollow or solid shaft with the socket.

2. The device as claimed in claim 1 wherein the means to reciprocate the drive shafts comprises an actuating handle pivoted to the housing to project at one end outside the housing and at its opposite end inside the housing, a running connection inside the housing between the actuating handle and the hollow and solid drive shafts whereby movement of the handle in one direction will move the hollow shaft forwardly and the solid shaft rearwardly and movement of the handle in the opposite direction will move the solid shaft forwardly and the hollow shaft rearwardly.

References Cited in the file of this patent
UNITED STATES PATENTS

| | | |
|---|---|---|
| 1,024,298 | Thomas | Apr. 23, 1912 |
| 1,378,781 | Glass | May 17, 1921 |
| 2,051,270 | Palla | Aug. 18, 1936 |
| 2,899,645 | Erwin | Aug. 11, 1958 |